Jan. 21, 1941. A. E. CRANSTON, JR., ET AL 2,229,279
BOX END
Filed Oct. 18, 1937
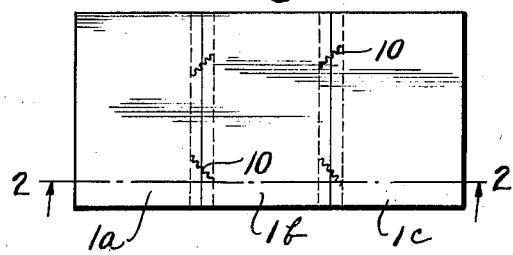
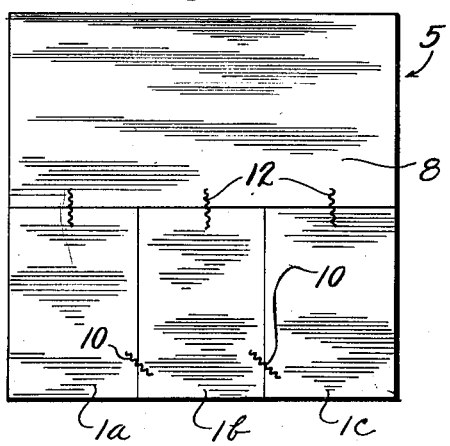
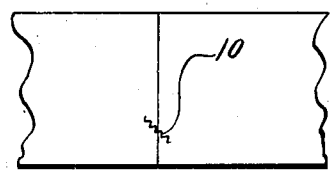
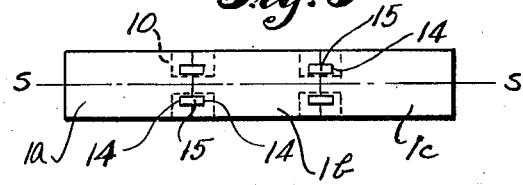
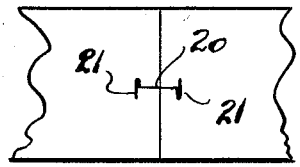
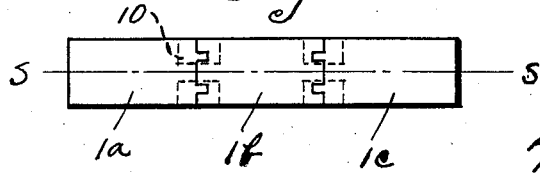
INVENTOR
ALBERT E. CRANSTON JR.
HAROLD H. CRANSTON
BY
Cook & Robinson ATTORNEY Patented Jan. 21, 1941

2,229,279

UNITED STATES PATENT OFFICE 2,229,279

BOX END

Albert E. Cranston, Jr., Spokane, and Harold H. Cranston, Wenatchee, Wash., assignors to Cranston Machinery Company, Wenatchee, Wash., a partnership Application October 18, 1937, Serial No. 169,604

1 Claim. (Cl. 217—17)

This invention relates to improvements in box-making, and it has reference more particularly to the manufacture of what are known in the box industry as "lug ends" and "box ends;" it being the principal object of this invention to provide for the manufacture of lug ends and box ends from short pieces of boards which, as a general rule, are considered to be waste material and a total loss.

Explanatory to the present invention, it will be stated here that those parts known as "lug ends" usually comprise but one piece of board and are approximately six inches wide and twelve inches long, while "box ends" are usually in one or two pieces and are approximately twelve inches wide and twelve inches long. It is the general practice, in making these parts, not to utilize pieces of wood that are less than twelve inches long, but there is a vast amount of good material of the shorter lengths that goes to waste because to use it requires the sizing, fitting and joining together of the pieces and this generally adds to the cost of production. Furthermore, the joining together of short pieces of board as heretofore practiced has not been desirable, either because of added expense, or because of the lack of equipment for manufacturing, or because the fabricated parts did not have the required strength.

In view of the above, it has been an object of this invention to provide a novel method of preparing and joining short lengths of board pieces to form "lug ends" or "box ends" which will be satisfactory from the standpoint of durability, strength and utility, and at the same time will be of lesser expense to manufacture because of the use of what otherwise is considered to be waste material.

It is also an object of the invention to provide a type of joint for short pieces that is suitable for joining pieces in end grain abutment, and which is especially designed for pieces to be resawed.

More specifically stated, the objects of the present invention reside in the edging of the pieces to be joined; in the character of the joints, especially in those pieces which are resawed, and in the means of securing the pieces together.

Still further objects reside in the details of construction of the joint and combination of parts as will hereinafter be fully described.

In accomplishing the objects of the invention, we have provided the improved details of construction, the preferred forms of which are illustrated in the accompanying drawing, wherein—

Fig. 1 is a face view of a "lug end" embodying the present invention.

Fig. 2 is a cross sectional view of the same taken on line 2—2 in Fig. 1.

Fig. 3 is an edge view of pieces prepared to form two lug ends by a resawing operation; showing the pieces in separated relation in order to better illustrate the joints used in connecting the pieces.

Fig. 4 is a face view of a box end embodying the present invention.

Figs. 5 and 6 are cross-sectional views of lug ends, prior to resawing, and illustrating alternative types of joints used to connect the pieces.

Fig. 7 is an enlarged detail showing the use of a corrugated fastener for joining parts together.

Fig. 8 is a view illustrating use of a fastener of another kind.

It will here be mentioned that, while the present type of lug end, and box end is designed for and intended that the pieces be joined together by corrugated fasteners, and the like, it may, in some instances be desired to employ glue; therefore, it is not the intent to limit the present construction to use of fasteners.

Referring more in detail to the drawing—

In Fig. 1 there is illustrated a lug end made up by use of three pieces of material, designated at 1a, 1b and 1c, each of which would be approximately four inches long as measured in the direction of the length of the piece, and placed with the grain of the wood lengthwise of the finished piece.

Prior to the assembling of these three pieces, the edges thereof, that are to be joined together, are formed with tongues and grooves which, when interfitted and secured, will form tight and substantial joints. The preferred type of joints for pieces designed to make a lug end is that illustrated in end view in Fig. 3, which, for better understanding, shows the pieces separated and prior to the resawing operation. In making this type of joint, pieces 1a and 1c are passed through a tongue and groove forming machine and each is formed only along that edge which is to be fitted to an intermediate piece, with a tongue 2 and a groove 3. Likewise, the intermediate piece of material 1b is formed at its opposite edges with grooves 4 and tongues 5. The tongues and grooves of all pieces, prior to resawing are symmetrically located between the opposite side faces and the medial plane of the piece so that on resawing the assembled parts, along the medial plane, to form two ends the pieces of each end will be joined together by the tongue and groove joints, as seen in Fig. 2.

Referring to Fig. 3, it will be observed that the tongue and groove of the same joint in any one piece are reversed and are coextensive with reference to their location in the piece. Also, it is a feature of the invention that all pieces are alike in their tongues and grooving, thus eliminating the necessity of more than one tongue and groove forming head in the machine which prepares the pieces. It will further be understood that by taking two pieces which have been edged by passing them once through the tongue and groove forming machine, and placing them in position as assumed by the pieces 1a and 1c in Fig. 3, at opposite sides of the intermediate piece 1b, which has been likewise prepared on two opposite edges, and then inverted, these three pieces may then be pressed together to close the joints. After the joints are closed, the pieces may then be permanently fastened together by use of suitable fastener devices such as the commonly used corrugated fasteners 10, as designated at 10. In pieces that are to be resawed, fasteners of limited length would be driven into the boards from opposite sides, then the line of resawing would pass between the fasteners driven in from opposite sides as is indicated by the lines 5—5 in Figs. 5 and 6. Since it may be desirable in some instances to fasten the pieces together by means of glued joints, or a combination of glue and fasteners. When glue is used, this is applied to the tongues and grooves prior to assembling the parts.

Going a little more into the details of construction of the joint, as shown in Fig. 3, it is to be understood that the tongue and groove of each piece are parallel and coextensive; that is, the tip of the tongue is exactly alined transversely of the piece with the entrance to the groove. Also, the end surface of the board, between the base of the tongue and mouth of the groove, is beveled, as seen at x. Likewise, at the outside of the tongue, the surface is beveled as at y, at an acute angle relative to the tongue and equal to that of surface x, and at the outside of the groove it is likewise beveled as at z. The design of the joint is such that any piece, provided with the tongue and groove as described, upon being inverted, becomes the complement of any other piece likewise equipped with a tongue and groove, and may be fitted thereto.

In the assembly of the board pieces 1a, 1b and 1c to form the lug end, or for use in a box end, the direction of grain must be lengthwise of the finished piece in order to insure the necessary rigidity and strength of joints, and the fasteners then must be driven as shown in Fig. 1, so as to cross the joints at an angle to obtain the best holding results.

In the making of a box end, as designated in its entirety by numeral 5 in Fig. 4, three pieces of board 1a, 1b and 1c are prepared and joined together as in making a lug end, then a solid piece of board 8 is disposed edge to edge with the section formed by the three pieces, and is secured thereto by glue or by use of suitable fasteners as shown at 12. The grain of the wood in piece 8 likewise is lengthwise of the section and parallel to that of the smaller pieces. The fasteners 12 should be driven in to cross the joint at right angles to the direction of grain.

Box ends, like the lug ends, might be made up in pieces of double thickness intended for resawing.

Also, in the making of the box ends, the parts might be arranged as shown in Fig. 4, or it may be more desirable in some instances to place a narrow strip corresponding to strip 8 at each side of a central panel, made up of short pieces. The principal requirement in the box end is to have at least one continuous piece extending the length of the panel formed by the pieces of short length.

While the type of joint that has been shown in Figs. 2 and 3 is the most desirable, it is not intended that the structures described shall be limited thereto, for manifestly the types of joints shown in Figs. 5 and 6 are suitable for some constructions. Fig. 5 shows the parts 1a, 1b and 1c grooved at adjoining edges as at 14 to receive splines 15 while the parts in Fig. 6 are formed with the usual tongue and groove joints, so arranged that on resawing, each end will have the parts united by a tongue and groove joint.

Fig. 8 shows an alternative form of fastener device, comprising a bar 20 with cross heads 21 at its opposite ends. These fasteners may be driven in, like the corrugated fasteners, but perpendicular to the joint line.

The advantage residing in these various constructions is that the short lengths of material may be utilized to advantage. The joints may be made close and tight and the parts secured firmly together by the fastener devices or by glue. Furthermore, by the use of short pieces, a great saving of material is accomplished.

Having thus described our invention, what we claim as new therein and desire to secure by Letters Patent is—

A joint for box ends and the like, designed for resawing and comprising a plurality of wood pieces joined in end to end relationship; each piece being formed along its joining edge with a tongue, and with a groove parallel to the tongue and coextension therewith with reference to the direction of length of the piece, and with a beveled surface between the tongue and groove and beveled surfaces at the outside of the groove and tongue providing that in the assembly of two pieces the tongues of one will fit within the grooves of the other and the beveled surfaces will provide wedging seats, and providing that in resawing the box end in a plane medial of the tongue and groove, the pieces in each end will be joined by tongue and groove joints.

ALBERT E. CRANSTON, Jr.
HAROLD H. CRANSTON.